United States Patent
Ema et al.

(10) Patent No.: US 12,032,540 B2
(45) Date of Patent: Jul. 9, 2024

(54) DATA MANAGEMENT SYSTEM, DATA MANAGEMENT METHOD, AND RECORDING MEDIUM HAVING RECORDED THEREON DATA MANAGEMENT PROGRAM

(71) Applicant: Yokogawa Electric Corporation, Tokyo (JP)

(72) Inventors: Nobuaki Ema, Tokyo (JP); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 339 days.

(21) Appl. No.: 17/344,996

(22) Filed: Jun. 11, 2021

(65) Prior Publication Data

US 2021/0400362 A1 Dec. 23, 2021

(30) Foreign Application Priority Data

Jun. 17, 2020 (JP) ................................. 2020-104880

(51) Int. Cl.
*G06F 16/215* (2019.01)

(52) U.S. Cl.
CPC ................. *G06F 16/215* (2019.01)

(58) Field of Classification Search
CPC ...... G06F 16/215; G06F 3/0656; G06F 3/067; G06F 16/901; G05B 23/0264; G05B 23/0221

See application file for complete search history.

(56) References Cited

U.S. PATENT DOCUMENTS

| 2012/0078652 | A1 | 3/2012 | Konishi |
| 2012/0296605 | A1 | 11/2012 | Hamzaoui |
| 2017/0091252 | A1 | 3/2017 | Debiec |
| 2019/0280896 | A1* | 9/2019 | Imamura ................ H04L 47/24 |
| 2020/0026435 | A1 | 1/2020 | Satou |
| 2020/0110393 | A1 | 4/2020 | Kumano |
| 2020/0225655 | A1* | 7/2020 | Cella ................ G05B 19/41875 |

FOREIGN PATENT DOCUMENTS

| JP | 201290962 A | 5/2012 |
| JP | 2012242159 A | 12/2012 |
| JP | 2015207970 A | 11/2015 |
| JP | 2018010477 A | 1/2018 |
| JP | 2018169754 A | 11/2018 |
| JP | 2019176311 A | 10/2019 |

OTHER PUBLICATIONS

Extended European Search Report for counterpart European Application No. 21179018.3, issued by the European Patent Office dated Nov. 8, 2021.

Office Action issued for counterpart Japanese Application No. 2020-104880, issued by the Japanese Patent Office dated Jun. 6, 2023 (drafted on May 30, 2023).

* cited by examiner

Primary Examiner — Maher N Algibhah

(57) ABSTRACT

A data management system is provided, which includes a data acquiring unit that acquires measurement data generated by measuring a measurement target from each of a plurality of sensors; a data storage unit that stores the acquired measurement data; and a data-amount reducing unit that deletes part of the measurement data acquired from a target sensor based on the measurement data acquired from another sensor among the plurality of sensors to reduce an amount of data to be stored.

20 Claims, 5 Drawing Sheets

| TIME | SENSOR A | | | SENSOR B | | | SENSOR C | | |
|---|---|---|---|---|---|---|---|---|---|
| | ACTUAL MEASUREMENT | PREDICTION | DIFFERENCE | ACTUAL MEASUREMENT | PREDICTION | DIFFERENCE | ACTUAL MEASUREMENT | PREDICTION | DIFFERENCE |
| T1 | 200 | 195 | 5 (2.5%) | 0.200 | 0.2012 | 0.0012 (0.6%) | 20.0 | 20.18 | 0.18 (0.9%) |
| T2 | 199 | | | 0.196 | | | 20.1 | | |
| T3 | 198 | | | 0.191 | | | 20.2 | | |
| T4 | 200 | | | 0.201 | | | 20.0 | | |
| T5 | 199 | | | 0.196 | | | 20.1 | | |
| T6 | 198 | 188.1 | 9.9 (5%) | 0.190 | 0.19152 | 0.00152 (0.8%) | 20.2 | 20.503 | 0.303 (1.5%) |
| T7 | 193 | | | 0.164 | | | 20.7 | | |
| T8 | 188 | | | 0.141 | | | 21.2 | | |
| T9 | 185 | | | 0.125 | | | 21.5 | | |
| T10 | 198 | | | 0.191 | | | 20.2 | | |

FIG. 3

DATA MANAGEMENT SYSTEM, DATA MANAGEMENT METHOD, AND RECORDING MEDIUM HAVING RECORDED THEREON DATA MANAGEMENT PROGRAM

The contents of the following Japanese patent application are incorporated herein by reference:
NO. 2020-104880 filed in JP on Jun. 17, 2020

BACKGROUND

1. Technical Field

The present invention relates to a data management system, a data management method, and a recording medium having recorded thereon a data management program.

2. Related Art

Patent Literature 1 discloses that "the present invention relates to the technique for achieving the high availability of a system and, in particular, the technique in which, even when there is a missing part of sets of sensor data, the missing data is interpolated with the remaining sensor data".

CITATION LIST

Patent Literature

[Patent Literature 1] Japanese Patent Application Publication No. 2012-242159

SUMMARY

A first aspect of the present invention provides a data management system. The data management system may include a data acquiring unit that acquires, from each of a plurality of sensors, measurement data generated by measuring a measurement target. The data management system may include a data storage unit that stores the acquired measurement data. The data management system may include a data-amount reducing unit that deletes part of the measurement data acquired from a target sensor based on the measurement data acquired from another sensor among the plurality of sensors to reduce an amount of data to be stored.

Another sensor may be different in type from the target sensor.

The data-amount reducing unit may delete part of the measurement data acquired from the target sensor for a period in which the measurement data acquired from another sensor falls within a predetermined range.

The data-amount reducing unit may reduce a number of samples per unit time in the measurement data acquired from the target sensor.

The data-amount reducing unit may reduce a data size per one data of the measurement data acquired from the target sensor.

The data management system may further include: a data predicting unit that generates prediction data obtained by predicting measurement data for each of the plurality of sensors by using the measurement data acquired from another sensor; and a sensor selecting unit that selects the target sensor based on a difference between the acquired measurement data and the generated prediction data.

The sensor selecting unit may select, as the target sensor, a sensor having the difference that is less than a predetermined threshold.

The sensor selecting unit may calculate the difference for each of the plurality of sensors and select, as the target sensor, a sensor having the relatively small difference.

The data-amount reducing unit may delete part of the measurement data acquired from the target sensor when a predetermined period of time has elapsed.

The data-amount reducing unit may delete part of the measurement data acquired from the target sensor when a remaining capacity for recording the measurement data is less than a predetermined threshold.

The data management system may further include a data sending unit that sends, to another system or apparatus, the measurement data having a reduced data amount.

A second aspect of the present invention provides a data management method. The data management method may include acquiring, from each of a plurality of sensors, measurement data generated by measuring a measurement target. The data management method may include storing the acquired measurement data. The data management method may include deleting part of the measurement data acquired from a target sensor based on the measurement data acquired from another sensor among the plurality of sensors to reduce an amount of data to be stored.

A third aspect of the present invention provides a recording medium having recorded thereon a data management program. The data management program may be executed by a computer. The data management program may cause the computer to function as a data acquiring unit that acquires measurement data generated by measuring a measurement target from each of a plurality of sensors. The data management program may cause the computer to function as a data storage unit that stores the acquired measurement data. The data management program may cause the computer to function as a data-amount reducing unit that deletes part of the measurement data acquired from a target sensor based on the measurement data acquired from another sensor among the plurality of sensors to reduce an amount of data to be stored.

The summary clause does not necessarily describe all necessary features of the embodiments of the present invention. The present invention may also be a sub-combination of the features described above.

BRIEF DESCRIPTION OF THE DRAWINGS

FIG. 3 shows an example of measurement data managed by the data management system 100 according to the present embodiment.

DESCRIPTION OF EXEMPLARY EMBODIMENTS

Hereinafter, the present invention will be described by way of embodiments, but the following embodiments are not intended to limit the invention specified in the claims. Also, all combinations of features described in the embodiments are not necessarily essential to solutions of the invention.

Figure 1:
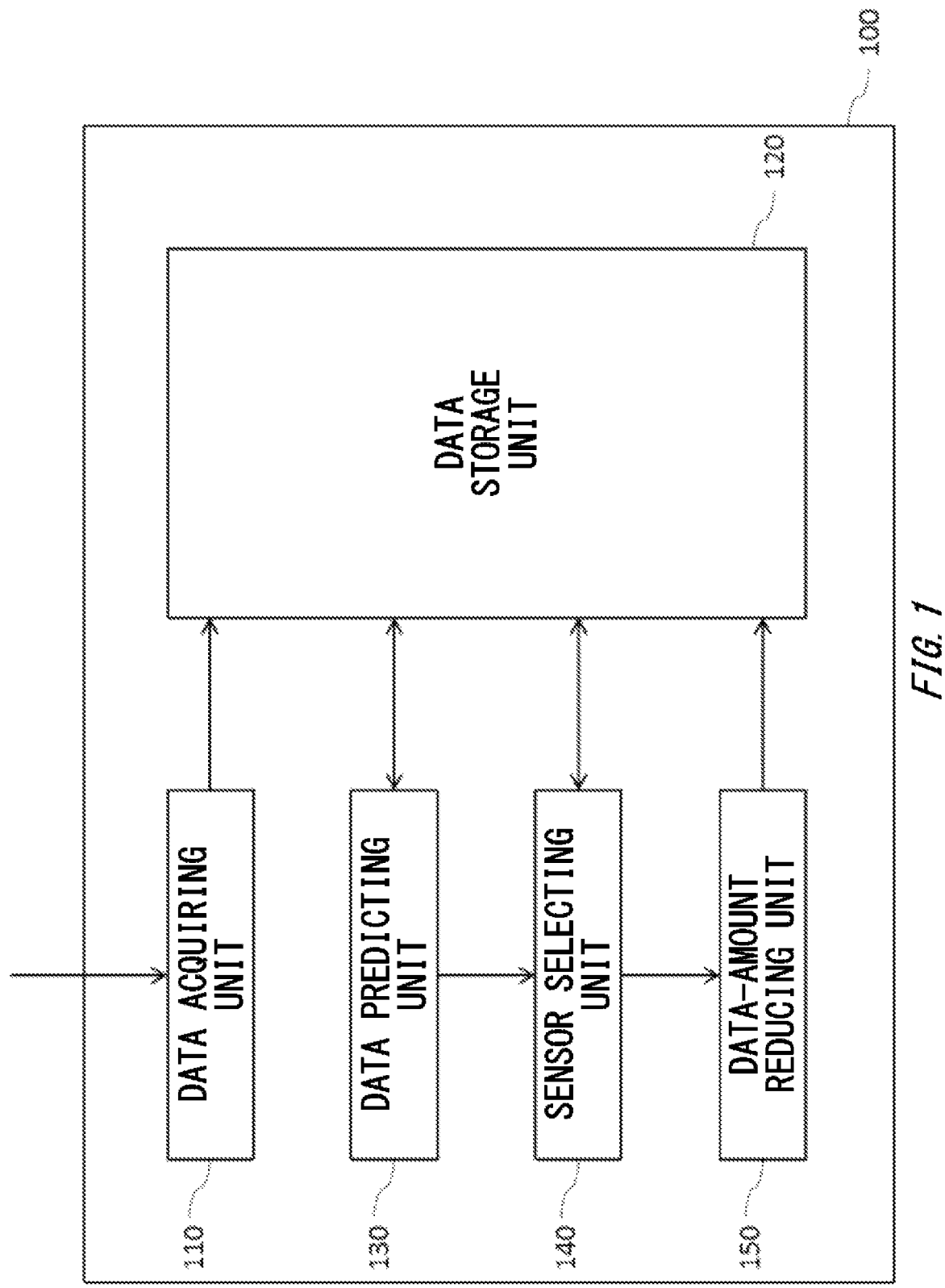
FIG. 1 shows an example of a block diagram of a data management system 100 according to the present embodiment.

FIG. 1 shows an example of a block diagram of a data management system 100 according to the present embodiment. The data management system 100 according to the present embodiment acquires and stores the measurement data generated by measuring the measurement target. The data management system 100 deletes part of the measurement data from the target sensor based on the measurement data from another sensor to reduce the amount of data to be stored.

According to the present embodiment, for example, the data management system 100 manages, as a target, measurement data acquired from a plurality of sensors provided in a plant. However, it is not limited thereto. The data management system 100 may manage, as a target, data from one or more sensors provided at any location other than the plant.

The data management system 100 may be a computer such as a PC (personal computer), a tablet computer, a smartphone, a workstation, a server computer, or a general-purpose computer, or may be a computer system in which a plurality of computers are connected to each other. Such a computer system is also a computer in a broad sense. The data management system 100 may be implemented by one or plurality of virtual computer environments that can be executed in a computer. Instead, the data management system 100 may be a dedicated computer designed for management of data, or may be a dedicated hardware implemented by a dedicated circuit. When the data management system 100 can be connected to the Internet, the data management system 100 may be implemented by a cloud computing.

The data management system 100 includes a data acquiring unit 110, a data storage unit 120, a data predicting unit 130, a sensor selecting unit 140, and a data-amount reducing unit 150. Note that each of these blocks are functionally separated blocks, and may not necessarily be consistent with an actual device configuration. That is, even if shown as one block in FIG. 1, the block may not necessarily be configured by one device. Even if shown as separate blocks in FIG. 1, those blocks may not necessarily be configured by separate devices.

The data acquiring unit 110 acquires, from each of the plurality of sensors, measurement data generated by measuring a measurement target. As an example, the data acquiring unit 110 may be a communication unit that acquires the measurement data generated by measuring the measurement target from each of the plurality of sensors in a time-series manner via, for example, a communication network.

Such communication network may be a network connecting a plurality of computers. For example, the communication network may be a global network interconnecting a plurality of computer networks, and, as an example, the communication network may be the Internet using the Internet Protocol, or the like. Instead, the communication network may be implemented by a dedicated line. Specifically, the data acquiring unit 110 may directly or indirectly conduct transactions with a mobile phone, a smartphone, a fourth-generation (4G) terminal, a fifth-generation (5G) terminal, or the like, to acquire the measurement data.

In the above description, as an example, the data acquiring unit 110 acquires the measurement data from each of the plurality of sensors via the communication network, but it is not limited thereto. For example, the data acquiring unit 110 may acquire the measurement data from each of the plurality of sensors via other means that is different from the communication network, such as a user input or various types of memory devices.

Such plurality of sensors can acquire measurement data generated by measuring a measurement target. For example, the plurality of sensors may be sensors (for example, process control (measuring) sensor) or IoT (Internet of Things) sensors installed in an OT (Operational Technology) region, and, as an example, may be industrial sensors connected with or integrally configured with one or plurality of field devices provided in the plant.

Such plant may be, for example, besides an industrial plant such as a chemical plant, a plant for managing and controlling a wellhead or its surrounding area of a gas field, an oil field, or the like, a plant for managing and controlling power generation such as hydraulic power generation, thermal power generation, or nuclear power generation, a plant for managing and controlling energy harvesting such as solar photovoltaic generation or wind power generation, and a plant for managing and controlling water and sewerage, a dam, or the like.

A field device provided in such plant may be, for example, a pressure gauge, a flow meter, a sensor device such as a temperature sensor, a valve device such as a flow control valve or an on-off valve, an actuator device such as a fan or a motor, an imaging device such as a camera or a video camera for capturing a situation or an object in the plant, an audio device such as a microphone or a speaker for collecting noises or the like in the plant or emitting an alarm or the like, and a location detection device for outputting location information of each device, or the like.

Therefore, the data acquiring unit 110 may acquire from each of the plurality of field devices or the like, as the measurement data, for example, measurement data generated by measuring by the sensor itself or measurement data measured in field devices such as a temperature, pressure, a fluid flow, acceleration, a magnetic field, a location, a camera image, switching on/off data, a sound, and any combination thereof. The data acquiring unit 110 may acquire, as the measurement data, a value generated by using an mathematical expression based on these data. The data acquiring unit 110 supplies the measurement data acquired from each of the plurality of sensors to the data storage unit 120.

The data storage unit 120 stores the acquired measurement data. As an example, the data storage unit 120 may store the measurement data, measured by the plurality of sensors and supplied from the data acquiring unit 110, in a time-series manner on a per-sensor basis.

The data predicting unit 130 may access the data storage unit 120 to view the measurement data measured by the plurality of sensors and stored in the data storage unit 120. The data predicting unit 130 uses the measurement data acquired from another sensor among the plurality of sensors to generate the prediction data that is obtained by predicting the measurement data for each of the plurality of sensors. The data predicting unit 130 may predict the measurement data for each of the plurality of sensors by using the measurement data acquired from another sensor having, as the measurement target, a different type of physical quantity from the sensor for which the measurement data is predicted. This will be described below. The data predicting unit 130 supplies the prediction data generated for each of the plurality of sensors to the sensor selecting unit 140.

The sensor selecting unit 140 refers to the prediction data supplied from the data predicting unit 130. Then, the sensor selecting unit 140 selects the target sensor for which part of the measurement data is to be deleted based on the difference between the raw measurement data stored in the data storage unit 120, i.e., the measurement data acquired by the data acquiring unit 110, and the prediction data generated by the data predicting unit 130. For example, the sensor selecting unit 140 may preferentially select the sensor having a small difference as the target sensor for which part of the measurement data is to be deleted. The sensor selecting unit 140 supplies the information about the selected sensor to the data-amount reducing unit 150.

The data-amount reducing unit 150 deletes part of the measurement data acquired from the target sensor based on the measurement data acquired from another sensor among the plurality of sensors to reduce the amount of data to be stored. More specifically, for example, the data-amount reducing unit 150 refers to the information about the sensor selected by the sensor selecting unit 140 to identify the target sensor. Then, the data-amount reducing unit 150 deletes part of the measurement data acquired from the target sensor among the measurement data stored by the data storage unit 120 to reduce the amount of data to be stored.

Figure 2:
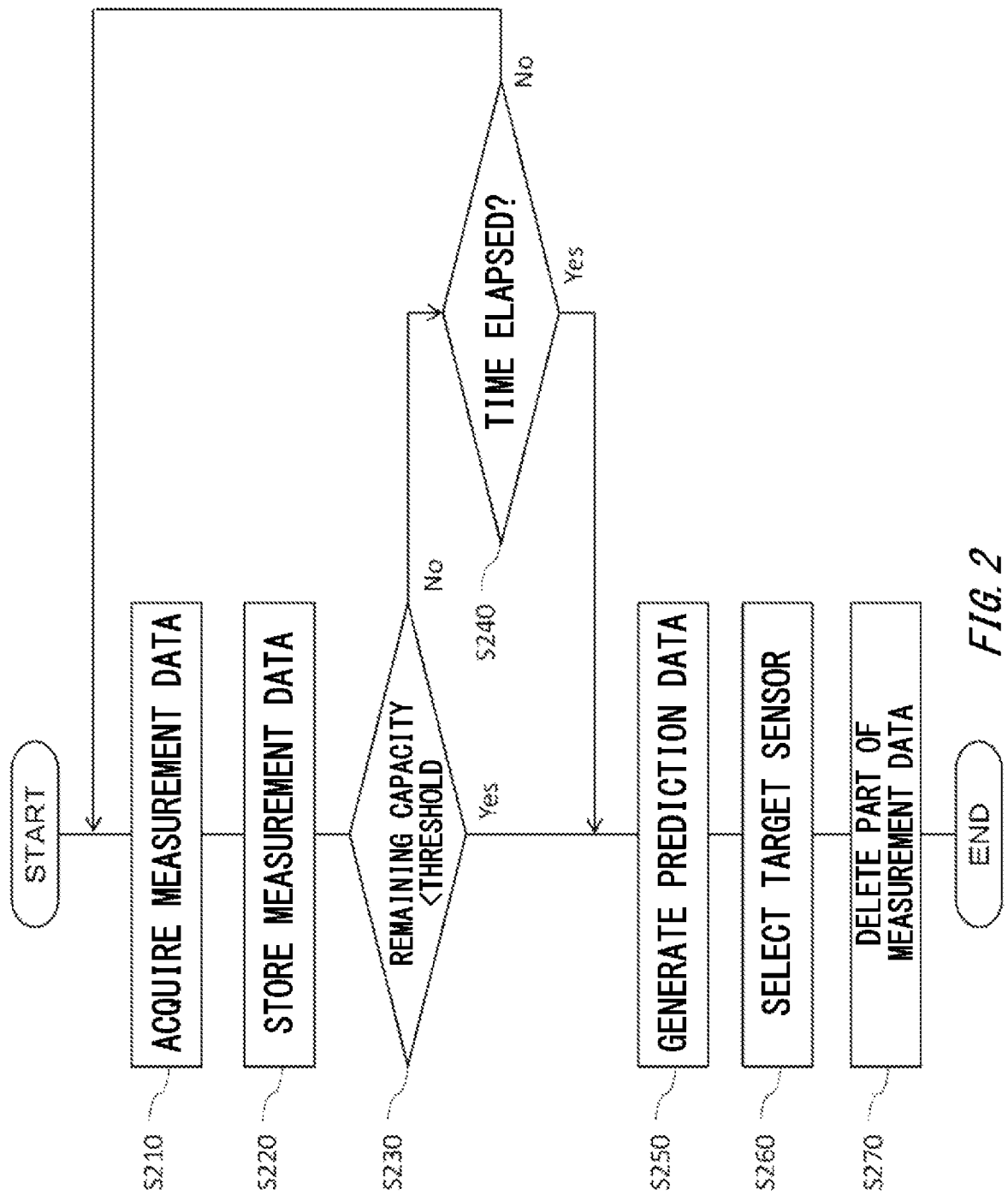
FIG. 2 shows an example of the flow to reduce the amount of data to be stored by the data management system 100 according to the present embodiment.

FIG. 2 shows an example of the flow to reduce the amount of data to be stored by the data management system 100 according to the present embodiment.

At Step S210, the data management system 100 acquires measurement data. For example, the data acquiring unit 110 acquires the measurement data generated by measuring the measurement target from each of the plurality of sensors in a time-series manner via the communication network. The data acquiring unit 110 supplies the measurement data acquired from each of the plurality of sensors in a time-series manner to the data storage unit 120.

At Step S220, the data management system 100 stores the measurement data. For example, the data storage unit 120 stores the measurement data acquired by the data acquiring unit 110 at Step S210 in a time-series manner on a per-sensor basis.

At Step S230, the data management system 100 determines whether the remaining capacity for recording the measurement data is less than a predetermined threshold. For example, the data management system 100 subtracts the amount of data stored by the data storage unit 120 at Step S220 from the total capacity for recording the measurement data to calculate the remaining capacity for recording the measurement data. Then, the data management system 100 compares the remaining capacity for recording the measurement data with the predetermined threshold. When it is determined that the remaining capacity for recording the measurement data is not less than the predetermined threshold (No), the data management system 100 proceeds to the process at Step S240.

At Step S240, the data management system 100 determines whether a predetermined period of time has elapsed. For example, the predetermined period of time may be the time that has elapsed after the measurement data was stored at Step S220. Instead or in addition, the predetermined period of time may be the time that has elapsed after the stored measurement data was last accessed. When it is determined that the predetermined period of time has not elapsed (No), the data management system 100 returns to the process at Step S210 and continues the flow.

Conversely, when it is determined at Step S230 that the remaining capacity for recording the measurement data is less than the predetermined threshold (Yes) or when it is determined at Step S240 that the predetermined period of time has elapsed (Yes), the data management system 100 proceeds to the process at Step S250.

At Step S250, the data management system 100 generates prediction data. For example, the data predicting unit 130 views the measurement data stored by the data storage unit 120 at Step S220 and uses the measurement data acquired by the data acquiring unit 110 from another sensor among the plurality of sensors at Step S210 to generate the prediction data obtained by predicting the measurement data for each of the plurality of sensors.

For example, the data predicting unit 130 may predict the value of the target physical quantity to be predicted by substituting the measurement value regarding another physical quantity, which is not the target to be predicted, into a predetermined mathematical expression. The data predicting unit 130 may predict the value of the target physical quantity to be predicted by substituting the value of the operation amount of the target apparatus into a predetermined mathematical expression. That is, the data predicting unit 130 may use the measurement data acquired from another sensor having, as the measurement target, a different type of physical quantity from the sensor for which the measurement data is predicted so as to predict the measurement data for each of the plurality of sensors.

It is assumed, for example, that the data management system 100 acquires the measurement data generated by measuring a flow rate F as the measurement target, the measurement data generated by measuring a pressure P as the measurement target, and the measurement data generated by measuring a temperature T as the measurement target from a sensor A, a sensor B, and a sensor C, respectively, installed in relatively close (i.e., physically close or close in terms of flow) positions within the plant.

As described above, when the sensors having different types of physical quantities as the measurement targets conduct measurement at relatively close locations, for example, the data management system 100 may predict the value of the pressure P by substituting the values of the flow rate F and the temperature T into a predetermined mathematical expression based on the known correlation.

In the above description, for example, the correlation between the sets of measurement data from the plurality of sensors is known; however, it is not limited thereto. For example, the correlation between the sets of measurement data from the plurality of sensors may vary depending on the installation environment of the plurality of sensors. In such a case, for example, the data predicting unit 130 may execute regression analysis on the measurement data from the plurality of sensors.

Expression 1 represents an example of the multiple regression model of each set of measurement data used for regression analysis. In Expression 1, ym denotes the prediction value of the measurement data for a sensor m, βm and i denote regression coefficients, xi denotes the actual measurement value of the measurement data acquired from a sensor i, n denotes the number of sensors, and c denotes the difference between the actual measurement value and the prediction value.

$$y_m = \sum_{i=1}^{n} \beta_{m,i} x_i + \varepsilon \qquad \text{[Expression 1]}$$

The data predicting unit 130 calculates, for example, the regression coefficients βm and i having the smallest difference ε based on Expression 1. Specifically, the data predicting unit 130 calculates the regression coefficients βm and i so as to minimize the difference ε between the prediction value ym of the measurement data for the sensor m and the sum of the values obtained by multiplying the actual measurement value xi of the measurement data acquired from another sensor by the regression coefficients βm and i, respectively. Then, the data predicting unit 130 uses the regression coefficients βm and i having the smallest difference ε to generate prediction data for each of the plurality of sensors. The data predicting unit 130 may supply the thus generated prediction data for each of the plurality of sensors to the sensor selecting unit 140.

At Step S260, the data management system 100 selects the target sensor. For example, the sensor selecting unit 140 refers to the prediction data predicted by the data predicting unit 130 at Step S250. Then, the sensor selecting unit 140 selects the target sensor for which part of the measurement data is to be deleted based on the difference between the raw measurement data stored by the data storage unit 120 at Step S220, i.e., the measurement data acquired by the data acquiring unit 110 at Step S210, and the prediction data generated by the data predicting unit 130 at Step S250. The sensor selecting unit 140 may select, as the target sensor, the sensor having a difference that is less than a predetermined threshold. Instead or in addition, the sensor selecting unit 140 may calculate the difference for each of the plurality of sensors and select, as the target sensor, the sensor having a relatively small difference. The sensor selecting unit 140 supplies the information about the selected sensor to the data-amount reducing unit 150.

At Step S270, the data management system 100 deletes part of the measurement data. For example, the data-amount reducing unit 150 deletes part of the measurement data acquired from the target sensor based on the measurement data acquired from another sensor among the plurality of sensors to reduce the amount of data to be stored. More specifically, for example, the data-amount reducing unit 150 refers to the information about the sensor selected by the sensor selecting unit 140 at Step S260 to identify the target sensor. Then, the data-amount reducing unit 150 deletes part of the measurement data acquired from the target sensor among the measurement data stored by the data storage unit 120 at Step S220 to reduce the amount of data to be stored.

For example, the data-amount reducing unit 150 deletes part of the measurement data acquired from the sensor B, which measures the pressure P, based on the measurement data acquired from the sensor A, which measures the flow rate F, and the sensor C, which measures the temperature T, to reduce the amount of data to be stored. When the data-amount reducing unit 150 deletes part of the measurement data acquired from the target sensor based on the measurement data acquired from other sensors among the plurality of sensors as described above, the other sensors may be different from the target sensor in the type of physical quantity that is the measurement target.

The data-amount reducing unit 150 may reduce the number of samples per unit time in the measurement data acquired from the target sensor. The data-amount reducing unit 150 may delete the data at an even-numbered time in the time-series data acquired from the target sensor.

Instead or in addition, the data-amount reducing unit 150 may reduce the data size per one data of the measurement data acquired from the target sensor. When the time-series data acquired from the target sensor includes a group of data sets in three decimal places, the data-amount reducing unit 150 may round the data sets to two decimal places so as to obtain the time-series data in which each data set has a decimal number in two decimal places. In the above description, for example, the data-amount reducing unit 150 reduces the number of significant digits by way of rounding; however, it is not limited thereto. The data-amount reducing unit 150 may use a technique different from rounding, such as rounding down and rounding up. The data-amount reducing unit 150 may reduce the number of bits, for example reduce from 16 bits to 8 bits, for quantizing each set of measurement data having a dynamic range in a time-series manner so as to reduce the data size per one data of the measurement data.

As described above, the data-amount reducing unit 150 may reduce the number of samples per unit time, e.g., decimate the samples in the measurement data in the time axis direction to delete part of the measurement data or may reduce the data size per one data, e.g., reduce the bit width in the size axis direction, i.e., reduce the number of quantization bits, to delete part of the measurement data.

The data management system 100 deletes part of the measurement data at Step S270 and ends the data-amount reduction flow. As described above, the data-amount reducing unit 150 may delete part of the measurement data acquired from the target sensor when the remaining capacity for recording the measurement data is less than the predetermined threshold, i.e., in response to Yes in the determination at Step S230. The data-amount reducing unit 150 may delete part of the measurement data acquired from the target sensor when the predetermined period of time has elapsed, i.e., in response to Yes in the determination at Step S240.

FIG. 3 shows an example of measurement data managed by the data management system 100 according to the present embodiment. As shown in the figure, it is assumed that the data management system 100 has acquired the actual measurement values of the measurement data from the sensor A, the sensor B, and the sensor C at times T1 to T10. In this case, the data management system 100 generates the prediction data generated by predicting the measurement data for each of the plurality of sensors by using the measurement data acquired from other sensors in accordance with the flow in FIG. 2.

For example, the data predicting unit 130 generates the prediction data generated by predicting the measurement data of the sensor A at the time T1 by using the actual measurement values of the measurement data acquired from the sensor B and the sensor C at the time T1. Similarly, the data predicting unit 130 generates the prediction data generated by predicting the measurement data of the sensor B at the time T1 by using the actual measurement values of the measurement data acquired from the sensor A and the sensor C at the time T1. Similarly, the data predicting unit 130 generates the prediction data generated by predicting the measurement data of the sensor C at the time T1 by using the actual measurement values of the measurement data acquired from the sensor A and the sensor B at the time T1.

Subsequently, the sensor selecting unit 140 calculates the difference between the actual measurement data and the prediction data for each of the plurality of sensors. The sensor selecting unit 140 may calculate, as the difference, the absolute value of the difference between the actual measurement data and the prediction data. Instead or in addition, the sensor selecting unit 140 may calculate, as the difference, the value obtained by dividing the absolute value of the difference between the actual measurement data and the prediction data by the actual measurement data, i.e., the ratio of the difference to the actual measurement data.

Then, based on the calculated difference, the sensor selecting unit 140 selects the target sensor for which part of the measurement data is to be deleted. The sensor selecting unit 140 may select, as the target sensor, a sensor, i.e., the sensor B and the sensor C in this figure, having a difference that is less than a predetermined threshold, e.g., 1%. Instead or in addition, the sensor selecting unit 140 may calculate the difference for each of the plurality of sensors and select, as the target sensor, a sensor having a relatively small difference, i.e., the sensor B having a relatively smallest difference in this figure.

Finally, the data-amount reducing unit 150 deletes part of the measurement data acquired from the target sensor among the stored measurement data to reduce the amount of data to be stored. When the sensor B is selected as the target sensor, the data-amount reducing unit 150 may delete the data at an even-numbered time, i.e., the measurement data "0.196" at the time T2 and the measurement data "0.201" at the time T4, among the measurement data acquired from the sensor B at the times T1 to T5 to reduce the number of samples per unit time in the measurement data acquired from the sensor B.

Instead or in addition, the data-amount reducing unit 150 may round the measurement data acquired from the sensor B at the times T1 to T5 to two decimal places to obtain the time-series data in two decimal places, i.e., the time-series data [0.20, 0.20, 0.19, 0.20, 0.20] in this figure, so as to reduce the bit width of the measurement data acquired from the sensor B.

The data management system 100 also generates the prediction data and selects the target sensor for the measurement data at the time T6 to the time T10 in the same manner for the measurement data at the time T1 to the time T5. For example, it is assumed that the sensor B having a difference that is less than 1% is selected as the target sensor for the measurement data at the time T6 to the time T10. It is assumed that 200±5 is set as the normal range of the measurement data of the sensor A. Similarly, it is assumed that 20±0.5 is set as the normal range of the measurement data of the sensor C. In such a case, even when the difference of the target sensor B is less than 1%, which is a selection criterion, the data-amount reducing unit 150 does not delete part of the measurement data from the sensor B at the time T6 to the time T10. In other words, the data-amount reducing unit 150 deletes part of the measurement data acquired from the target sensor for a period in which the measurement data acquired from another sensor falls within a predetermined range. Thus, the data management system 100 may prevent the deletion of even significant measurement data that is highly likely to be referred to later on. In the description with reference to the drawing, for example, the data management system 100 uses one-dimensional measurement data as the management target. However, it is not limited thereto. The data management system 100 may use two-dimensional measurement data as the management target. Specifically, in the above description, the data management system 100 acquires and manages one-dimensional data from one sensor at one time. However, instead or in addition, the data management system 100 may acquire and manage two-dimensional data, such as thermographic image data, from one sensor at one time. In such a case, in order to reduce the number of samples per unit time in the measurement data acquired from the target sensor, the data-amount reducing unit 150 may reduce the number of frames per unit time in the measurement data. In order to reduce the data size per one data of the measurement data acquired from the target sensor, the data-amount reducing unit 150 may reduce the number of pixels per frame in the measurement data or the number of bits per pixel.

It is expected that an amount of data will explosively increase, for example, when a process control system in the OT (Operational Technology) region is coupled to a system in the IT (Information Technology) region or the like. In such a situation, it is not practical to store all the data as it is, and it is necessary to reduce the amount of data or sort out the data. There is a conventionally known technique for interpolating the target sensor data with the other sensor data. However, according to the conventional technique, when there is certain missing sensor data, the missing sensor data is interpolated with the other sensor data so as to achieve the availability of the system, not to reduce the amount of data to be stored.

On the other hand, the data management system 100 according to the present embodiment deletes part of the measurement data acquired from the target sensor based on the measurement data acquired from another sensor to reduce the amount of data to be stored. Thus, with the data management system 100 according to the present embodiment, when the measurement data from a certain sensor is accurately predictable with the measurement data from another sensor, part of the measurement data from the sensor may be preferentially deleted, and the measurement data may be efficiently managed. In the data management system 100 according to the present embodiment, even when a sensor is selected as the target sensor, part of the measurement data from the sensor is only deleted subsequently, and the measurement data from the sensor is continuously acquired and stored. Thus, with the data management system 100 according to the present embodiment, the measurement data from the sensor may be used for real-time control even when, for example, a sudden change occurs in the process side.

The data management system 100 according to the present embodiment deletes part of the measurement data acquired from the target sensor based on the measurement data acquired from another sensor having a different type of physical quantity as the measurement target. Thus, with the data management system 100 according to the present embodiment, when the measurement data from a plurality of types of sensors is managed, part of the measurement data may be deleted more efficiently.

The data management system 100 according to the present embodiment deletes part of the measurement data acquired from the target sensor for a period in which the measurement data acquired from another sensor falls within a predetermined range. Thus, with the data management system 100 according to the present embodiment, part of the measurement data acquired from the target sensor may be still stored without being deleted for a period in which the measurement data acquired from another sensor does not fall within the normal range.

In order to reduce the data amount of the measurement data, the data management system 100 according to the present embodiment reduces the number of samples per unit time in the stored measurement data or reduces the data size per one data of the stored measurement data. Thus, with the data management system 100 according to the present embodiment, at least part of the measurement data may be selectively deleted in either the time axis direction or the size axis direction depending on the feature of the measurement data.

The data management system 100 according to the present embodiment selects the target sensor based on the difference between the measurement data and the prediction data. Thus, with the data management system 100 according to the present embodiment, the target for which part of the measurement data is deleted may be selected based on objective data.

The data management system 100 according to the present embodiment selects, as the target sensor, a sensor having a difference that is less than a predetermined threshold or a sensor having a relatively small difference. Thus, with the data management system 100 according to the present embodiment, the target for which part of the measurement data is to be deleted may be selected depending on how much or when the data amount of the measurement data to be stored needs to be deleted.

The data management system 100 according to the present embodiment reduces the data amount of the measurement data when the remaining capacity for recording is less than a predetermined threshold or when a predetermined period of time has elapsed. Thus, with the data management system according to the present embodiment, part of the measurement data may be deleted when the data amount of the measurement data to be stored needs to be reduced.

In the above description, for example, the data management system 100 deletes part of the measurement data from the target sensor to reduce the data amount without leaving the acquired raw measurement data as it is. However, it is not limited thereto.

Figure 4:
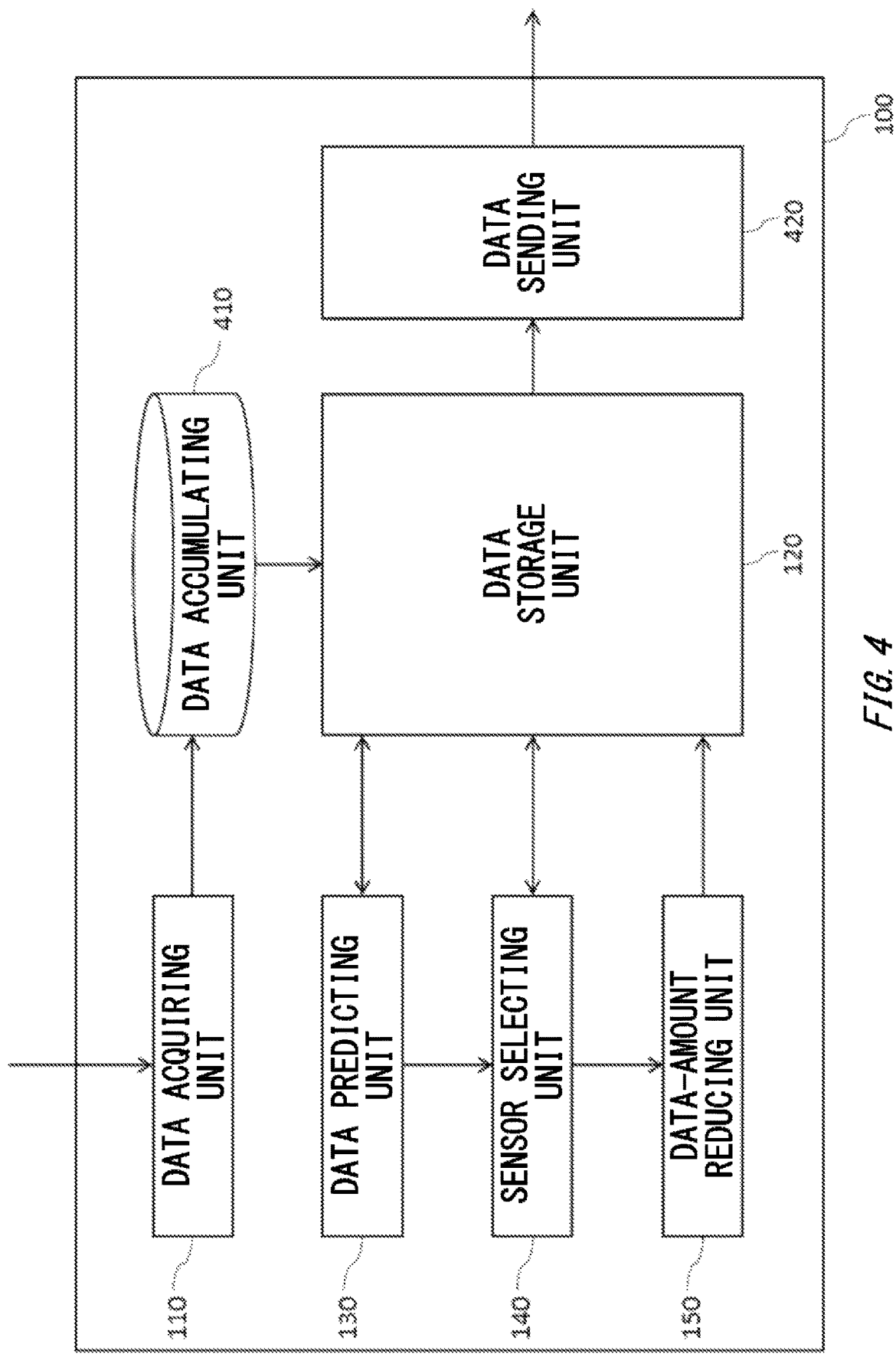
FIG. 4 shows an example of a block diagram of the data management system 100 according to a variant of the present embodiment.

FIG. 4 shows an example of a block diagram of the data management system 100 according to a variant of the present embodiment. In FIG. 4, components having the same function and configuration as those in FIG. 1 are given the same reference numerals, and the following describes only differing points. For example, the data management system 100 according to the present variant may be provided in an OT region, and may be able to send measurement data acquired from a sensor provided in the OT region to another system or apparatus provided in an IT region. The data management system 100 according to the present variant further includes a data accumulating unit 410 and a data sending unit 420.

In the data management system 100 according to the present variant, the data acquiring unit 110 supplies the measurement data acquired from each of the plurality of sensors to the data accumulating unit 410 instead of the data storage unit 120.

The data accumulating unit 410 accumulates the measurement data. As an example, the data accumulating unit 410 may store, for each sensor in a time series manner, all of the measurement data supplied from the data acquiring unit 110. Then, the data accumulating unit 410 supplies, among the accumulated measurement data, target measurement data to be sent to another system or apparatus to the data storage unit 120. Such target to be sent may be selected based on a user input or may be automatically selected by the data management system 100, for example.

Therefore, in the data management system 100 according to the present variant, the data storage unit 120 stores, among the measurement data acquired from each of the plurality of sensors, target measurement data to be sent to another system or apparatus.

In the data management system 100 according to the present variant, the data-amount reducing unit 150 deletes part of the measurement data acquired from the target sensor among the target measurement data that is to be sent and is stored in the data storage unit 120.

Then, the data sending unit 420 sends the measurement data stored in the data storage unit 120 after part of the measurement data from the target sensor has been deleted and the data amount has been reduced, i.e., the target measurement data to be sent, the data amount of which has been reduced, to another system or apparatus via a network, or the like.

As described above, the data management system 100 according to the present variant deletes part of the measurement data acquired from the target sensor among the target measurement data to be sent. Thus, the data management system 100 according to the present variant can reduce an amount of data to be sent from the data management system 100, for example, when sending the measurement data from the OT region to the IT region. That is, with the data management system 100 according to the present embodiment, deleting part of the measurement data acquired from the target sensor may include, in a broad sense, excluding the measurement data from the target to be sent to another system or apparatus in addition to completely deleting the measurement data from the storage area.

Various embodiments of the present invention may be described with reference to flowcharts and block diagrams, and blocks in the flowcharts and the block diagrams may represent (1) stages of processes in which operations are performed or (2) sections of apparatuses responsible for performing operations. Certain stages and sections may be implemented by dedicated circuitry, programmable circuitry supplied together with computer-readable instructions stored on computer-readable media, and/or processors supplied together with computer-readable instructions stored on computer-readable media. The dedicated circuit may include a digital and/or analog hardware circuit, or may include an integrated circuit (IC) and/or a discrete circuit. Programmable circuitry may include reconfigurable hardware circuits including logical AND, OR, XOR, NAND, NOR, and other logical operations, flip-flops, registers, memory elements such as field-programmable gate arrays (FPGA) and programmable logic arrays (PLA), and the like.

Computer-readable media may include any tangible device that can store instructions for execution by a suitable device and, as a result, the computer-readable medium having instructions stored therein is provided with an article of manufacture including instructions which may be executed to create means for performing operations specified in the flowcharts or block diagrams. Examples of computer-readable media may include an electronic storage medium, a magnetic storage medium, an optical storage medium, an electromagnetic storage medium, and a semiconductor storage medium. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, and an integrated circuit card.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), or C++, and conventional procedural programming languages, such as the "C" programming language or similar programming languages.

Computer-readable instructions may be provided to a processor of a general-purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, or a microcontroller.

Figure 5:
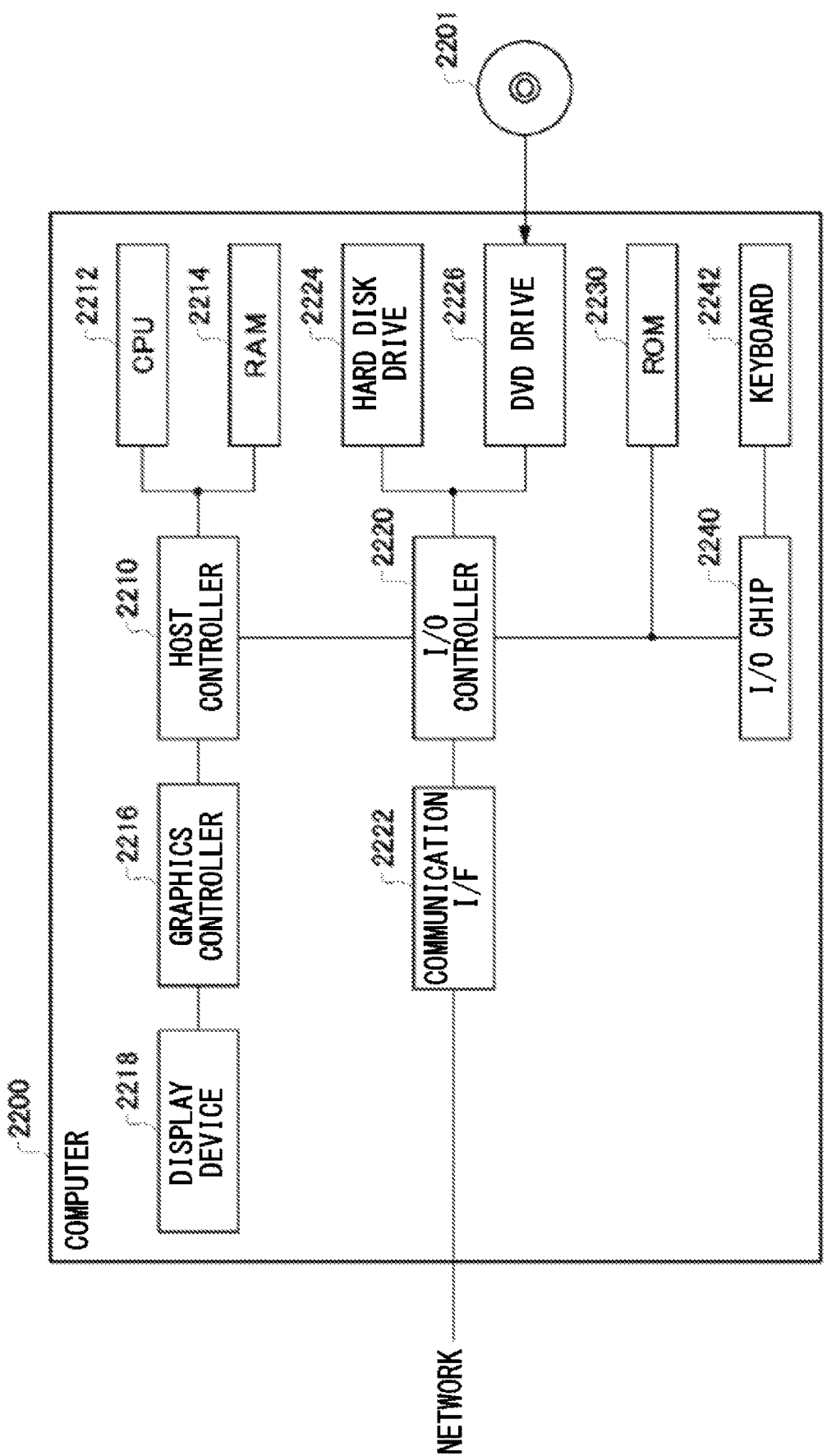
FIG. 5 shows an example of a computer 2200 in which a plurality of aspects of the present invention may be embodied entirely or partially.

FIG. 5 illustrates an example of a computer 2200 in which a plurality of aspects of the present invention may be wholly or partially embodied. A program that is installed in the computer 2200 can cause the computer 2200 to function for operations associated with the apparatus according to the embodiment of the present invention or as one or more sections in the apparatus, or cause the computer 2200 to perform the operations or the one or more sections, and/or cause the computer 2200 to perform processes according to the embodiment of the present invention or stages of the processes. Such a program may be performed by a CPU 2212 so as to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to a program stored in the ROM 2230 and the RAM 2214, thereby controlling each unit. The graphics controller 2216 acquires image data which is generated, by the CPU 2212, in a frame buffer or the like provided in the RAM 2214 or in itself so as to cause the image data to be displayed on the display device 2218.

The communication interface 2222 communicates with other electronic devices via the network. The hard disk drive 2224 stores programs and data used by the CPU 2212 in the computer 2200. The DVD-ROM drive 2226 reads the program or data from a DVD-ROM 2201 and provides the program or data to the hard disk drive 2224 via the RAM 2214. The IC card drive reads programs and data from the IC card and/or writes programs and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, serial port, keyboard port, mouse port, or the like.

The program is provided by a computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing described in these programs is read by the computer 2200, resulting in cooperation between the program and the various types of hardware resources described above. An apparatus or a method may be constituted by realizing the operation or processing of information in accordance with the usage of the computer 2200.

For example, when communication is executed between the computer 2200 and an external device, the CPU 2212 may execute a communication program loaded onto the RAM 2214 and instruct the communication interface 2222 to perform communication processing based on the processing described in the communication program. Under the control of the CPU 2212, the communication interface 2222 reads transmission data stored in a transmission buffering region provided in a recording medium such as the RAM 2214, the hard disk drive 2224, the DVD-ROM 2201 or the IC card, transmits the read transmission data to the network, or writes the received data which is received from the network to a reception buffering region, or the like, provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), or the IC card, and perform various types of processing on the data on the RAM 2214. The CPU 2212 then writes back the processed data to the external recording medium.

Various types of information such as various types of programs, data, tables, and databases may be stored in the recording medium to undergo information processing. The CPU 2212 may perform various types of processing on the data read from the RAM 2214, including various types of operations, information processing, condition judging, conditional branch, unconditional branch, search/replacement of information, and the like, as described throughout this disclosure and designated by an instruction sequence of programs, and writes the result back to the RAM 2214. The CPU 2212 may search for information in a file, database, or the like in the recording medium. For example, when a plurality of entries each having an attribute value of a first attribute associated with an attribute value of a second attribute are stored in the recording medium, the CPU 2212 may search, from among the plurality of entries, for an entry matching a condition in which the attribute value of the first attribute is specified, and read the attribute value of the second attribute stored in the entry, thereby acquiring the attribute value of the second attribute associated with the first attribute that satisfies a predetermined condition.

The program or software module described above may be stored on the computer 2200 or in a computer-readable medium near the computer 2200. A recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: data management system
110: data acquiring unit
120: data storage unit
130: data predicting unit
140: sensor selecting unit
150: data-amount reducing unit
410: data accumulating unit
420: data sending unit
2200: computer
2201: DVD-ROM
2210: host controller
2212: CPU
2214: RAM
2216: graphics controller
2218: display device
2220: input/output controller
2222: communication interface
2224: hard disk drive
2226: DVD-ROM drive
2230: ROM
2240: input/output chip
2242: keyboard

What is claimed is:

1. A data management system comprising:
at least one processor;
a data acquiring section of the at least one processor, when executed by the at least one processor, configured to acquire measurement data generated by measuring a measurement target from each of a plurality of different type sensors;
a data storage device configured to store the acquired measurement data, the data storage device storing a data stream of measurement data from each of the plurality of different type sensors comprising at least two different type sensors, at least one of the plurality of different type sensors having an output which is correlated with an output of another of the plurality of different type sensors which is of a different type than the one of the plurality of different type sensors, the at least two different type sensors being from a group including:
a pressure gauge,
a flow meter,
a temperature sensor,
a camera,
a video camera,
a microphone, and
a location detector;
a sensor selecting section of the at least one processor, when executed by the at least one processor, configured to determine a difference between an actual value output from each one of the plurality of different type sensors, and a predicted value based on a correlation of the one of the plurality of different type sensors with remaining ones of the plurality of different type sensors, a targeted one of the plurality of different type sensors being selected for data reduction based on the determined difference being at least one of (a) less than a predetermined threshold, and (b) having a smallest difference as among the plurality of different type sensors; and
a data-amount reducing section of the at least one processor, when executed by the at least one processor, configured to delete part of the measurement data acquired from the selected targeted sensor after having been stored in the data storage device based on the measurement data acquired from the another sensor to reduce an amount of data stored in the data storage device;
when a remaining capacity in the data storage device is less than a predetermined threshold, one of the plurality of different type sensors is periodically selected for data reduction, the data reduction being at least one of:
decimation of the measurement data from the selected targeted sensor in a time axis direction, and
reduction of a bit width of the measurement data from the selected targeted sensor in a size axis direction.

2. The data management system according to claim 1, wherein the another sensor is different in type from the selected targeted sensor.

3. The data management system according to claim 1, wherein the data-amount reducing section is configured to delete part of the measurement data acquired from the selected targeted sensor for a period in which the measurement data acquired from the another sensor falls within a predetermined range.

4. The data management system according to claim 2, wherein the data-amount reducing section is configured to delete part of the measurement data acquired from the selected targeted sensor for a period in which the measurement data acquired from the another sensor falls within a predetermined range.

5. The data management system according to claim 1, wherein the data-amount reducing section is configured to reduce a number of samples per unit time in the measurement data acquired from the selected targeted sensor.

6. The data management system according to claim 2, wherein the data-amount reducing section is configured to reduce a number of samples per unit time in the measurement data acquired from the selected targeted sensor.

7. The data management system according to claim 1, wherein the data-amount reducing section is configured to reduce a data size per one data of the measurement data acquired from the selected targeted sensor.

8. The data management system according to claim 2, wherein the data-amount reducing section is configured to reduce a data size per one data of the measurement data acquired from the selected targeted sensor.

9. The data management system according to claim 1, further comprising:
a data predicting section of the at least one processor, when executed by the at least one processor, being configured to generate prediction data obtained by predicting measurement data for each of the plurality of different type sensors by using the measurement data acquired from the another sensor.

10. The data measurement system according to claim 2, further comprising:
a data predicting section of the at least one processor, when executed by the at least one processor, being configured to generate prediction data obtained by predicting measurement data for each of the plurality of different type sensors by using the measurement data acquired from the another sensor.

11. The data management system according to claim 6, wherein the sensor selecting section is further configured to select, as the targeted sensor, a sensor having the difference that is less than a predetermined threshold.

12. The data management system according to claim 6, wherein the sensor selecting section is further configured to calculate the difference for each of the plurality of different type sensors and select, as the targeted sensor, a sensor having a relatively small difference.

13. The data management system according to claim 7, wherein the sensor selecting section is further configured to calculate the difference for each of the plurality of different type sensors and select, as the targeted sensor, a sensor having a relatively small difference.

14. The data management system according to claim 1, wherein the data-amount reducing section is configured to delete part of the measurement data acquired from the target sensor when the remaining capacity in the data storage device for recording the measurement data is less than the predetermined threshold.

15. The data management system according to claim 2, wherein the data-amount reducing section is configured to delete part of the measurement data acquired from the selected targeted sensor when the remaining capacity in the data storage device for recording the measurement data is less than the predetermined threshold.

16. The data management system according to claim 1, wherein the data-amount reducing section is configured to delete part of the measurement data acquired from the selected targeted sensor when a predetermined period of time has elapsed.

17. The data management system according to claim 2, wherein the data-amount reducing section is configured to delete part of the measurement data acquired from the selected targeted sensor when a predetermined period of time has elapsed.

18. The data management system according to claim 1, further comprising a data sending section of the at least one processor, when executed by the at least one processor, configured to send, to another system or apparatus, the measurement data having a reduced data amount.

19. A data management method comprising:
acquiring measurement data generated by measuring a measurement target from each of a plurality of different type sensors;
storing, in a data storage device, a data stream of the acquired measurement data from each of the plurality of different type sensors comprising at least two different type sensors, at least one of the plurality of different type sensors having an output which is correlated with an output of another of the plurality of different type sensors which is of a different type than the one of the plurality of different type sensors, the at least two different type sensors being from a group including:
a pressure gauge,
a flow meter,
a temperature sensor,
a camera,
a video camera,
a microphone, and
a location detector;
selecting a targeted one of the plurality of different type sensors for data reduction based on a determined difference between an actual value output from each one of the plurality of different type sensors, and a predicted value based on a correlation of the one of the plurality of different type sensors with remaining ones of the plurality of different type sensors, a targeted one of the plurality of different type sensors being selected for data reduction based on the determined difference being at least one of (a) less than a predetermined threshold, and (b) having a smallest difference as among the plurality of different type sensors; and
deleting part of the measurement data acquired from the selected targeted sensor after having been stored in a data storage device based on the measurement data acquired from the another sensor to reduce an amount of data stored in the data storage device;
when a remaining capacity in the data storage device is less than a predetermined threshold, one of the plurality of different type sensors is periodically selected for data reduction, the data reduction being at least one of:
decimation of the measurement data from the selected targeted sensor in a time axis direction, and
reduction of a bit width of the measurement data from the selected targeted sensor in a size axis direction.

20. A non-transitory recording medium having recorded thereon a data management program that, when executed by a computer, causes the computer to function as:
a data acquiring section of at least one processor of the computer configured to acquire measurement data generated by measuring a measurement target from each of a plurality of different type sensors;
a data storage device configured to store the acquired measurement data, the data storage device storing a data stream of measurement data from each of the plurality of different type sensors comprising at least two different type sensors, at least one of the plurality of different type sensors having an output which is correlated with an output of another of the plurality of different type sensors, the at least two different type sensors being from a group including:
a pressure gauge,
a flow meter,
a temperature sensor,
a camera,
a video camera,
a microphone, and
a location detector;
a sensor selecting section of the at least one processor, when executed by the at least one processor, configured to determine a difference between an actual value output from each one of the plurality of different type sensors, and a predicted value based on a correlation of the one of the plurality of different type sensors with remaining ones of the plurality of different type sensors, a targeted one of the plurality of different type sensors being selected for data reduction based on the determined difference being at least one of (a) less than a predetermined threshold, and (b) having a smallest difference as among the plurality of different type sensors; and
a data-amount reducing section of the at least one processor configured to delete part of the measurement data acquired from the selected targeted sensor after having been stored in the data storage device based on the measurement data acquired from the another sensor to reduce an amount of data stored in the data storage device;
when a remaining capacity in the data storage device is less than a predetermined threshold, one of the plurality of different type sensors is periodically selected for data reduction, the data reduction being at least one of:

decimation of the measurement data from the selected targeted sensor in a time axis direction, and
reduction of a bit width of the measurement data from the selected targeted sensor in a size axis direction.

* * * * *